May 29, 1962 — R. ROSSI — 3,036,785
SPOOL DRIVE
Filed Jan. 21, 1960
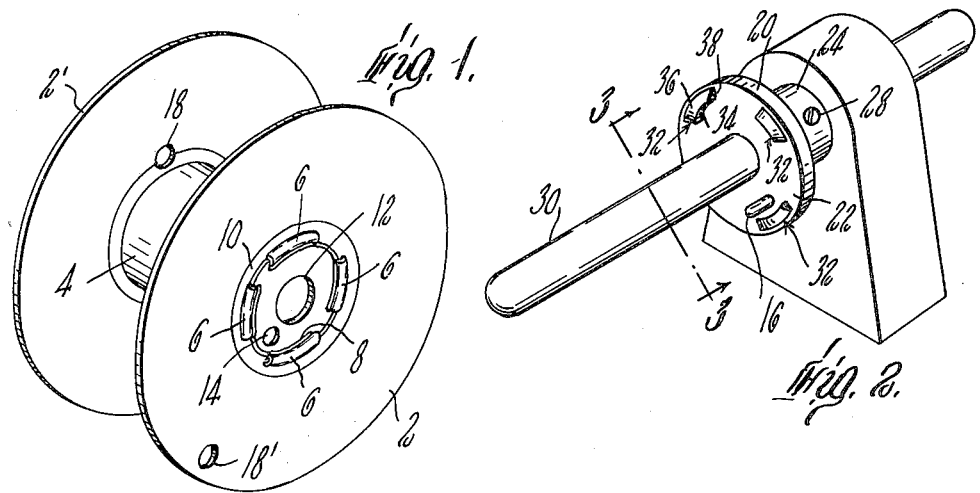
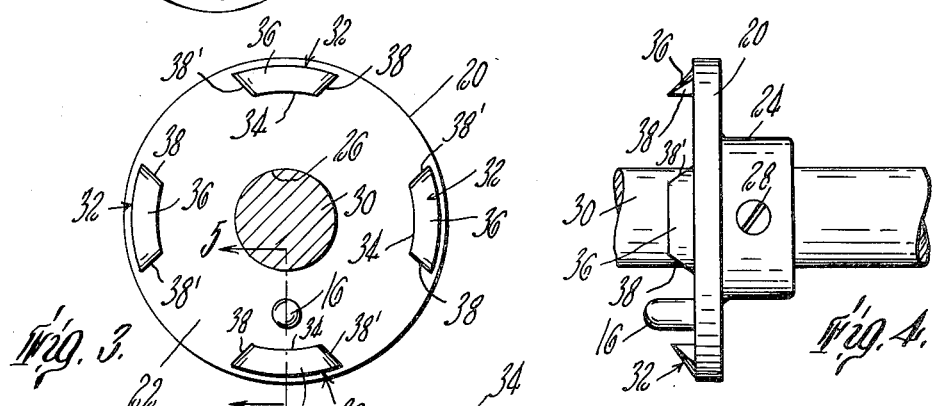
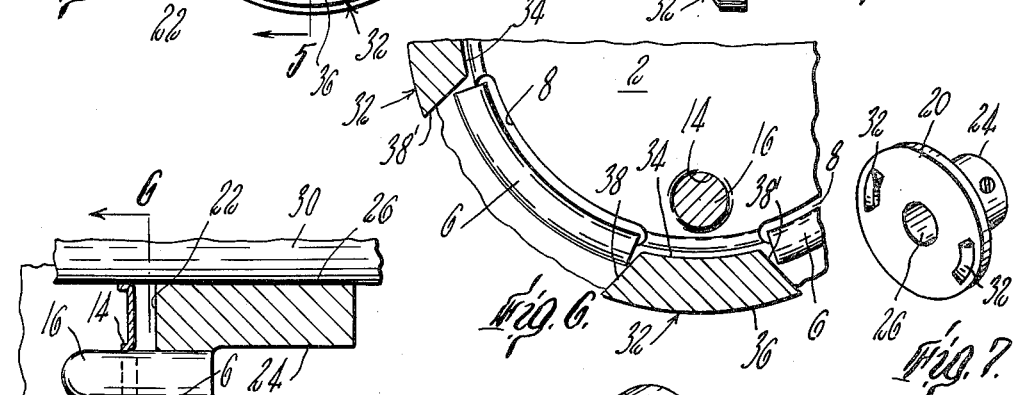
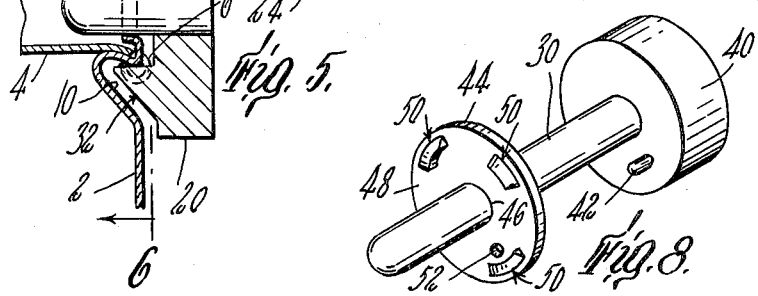

United States Patent Office 3,036,785
Patented May 29, 1962

3,036,785
SPOOL DRIVE
Ralph Rossi, East Providence, R.I., assignor to Carlton Manufacturing Co., Pawtucket, R.I., a corporation of Rhode Island
Filed Jan. 21, 1960, Ser. No. 3,960
8 Claims. (Cl. 242—46.2)

The present invention relates to winding and reeling methods and apparatus and, more particularly, to a driving head for use on a drive spindle for rotating a spool placed thereon to wind wire on the spool.

In the winding of electrical wire on sheet metal spools for retail sale, the wire is wound on the spools, in accordance with one established procedure, by the operator placing an empty spool over the end of a drive spindle so that one of the heads of the spool, provided with an eccentric aperture, rests against a drive head on the spindle having an eccentric drive pin which is received in the aperture of the spool head to rotate the spool. An end of the wire is then engaged with the spool and the rotation of the drive spindle and head is started. For cost reasons it is important that the spool be started quickly, driven rapidly and quickly stopped when it has been filled. A difficulty, however, is that the sheet metal of the spool head, which for cost and other reasons must be of a light gauge, is frequently torn by the drive pin in such quick starting or stopping.

The present invention provides a spool drive head which overcomes this difficulty and which securely engages the spool so that rotation of the spool may be started and stopped quickly and without risk of destructive action on the spool.

An object of the invention is to provide an improved drive head for use in rotating spools to wind strand material such as wire thereon.

A further object is to provide such a drive head which will directly engage and drive portions of the barrel of the spool.

A further object of the invention is to provide an adapter which may be used with the conventional spool drive head to provide the advantages of the invention.

Other and further objects and advantages of the invention will become apparent from the following description of presently preferred illustrative embodiments thereof, in which reference is made to the accompanying drawing, wherein, FIG. 1 is a perspective view of a wire spool of the type with which the drive head of the invention may be used, showing the structural features of the spool of which use is made in the invention;

FIG. 2 is a perspective view of a spool drive spindle having thereon a drive head illustrative of the invention;

FIG. 3 is a transverse sectional view on line 3—3 of FIG. 2 looking in the direction of the arrows;

FIG. 4 is a side view of the drive head of FIG. 2;

FIG. 5 is a fragmentary sectional view on line 5—5 of FIG. 3 showing the manner of engagement of the drive head with a spool;

FIG. 6 is a sectional view on line 6—6 of FIG. 5;

FIG. 7 is a perspective view of a modification; and,

FIG. 8 is a perspective view of a further modification in the nature of an adapter for use with a conventional spool drive head.

The invention is of use in connection with the driving of spools of the type wherein the spool has spaced projections on the outer face of at least one of its heads. It is particularly useful with spools made up from two light-gauge sheet metal heads interconnected by a hollow light-gauge sheet metal barrel having tongue or tab portions of the metal of the barrel at each end thereof extending through spaced openings in the heads and projecting outside the heads.

A spool of this construction is shown in FIG. 1 and comprises spaced light-gauge sheet metal heads 2, 2' interconnected by a light-gauge sheet metal hollow cylindrical barrel 4. Each of the heads is secured to the barrel by means of spaced tabs 6 which are formed by portions of the sheet metal of the barrel 4 projecting beyond each end of the barrel. In the particular spool shown there are four such tabs at each end equally spaced around the barrel. In the assembly of the heads on the barrel during manufacture of the spool, the tabs 6 are inserted through apertures 8 in the head. These apertures are concentrically disposed about the axis of the head and are formed in the light-gauge sheet metal of the head in a stamping operation during the manufacture of the head. Lying slightly outwardly of the apertures 8 is an annular groove or depression 10 (FIGS. 1 and 5). After the heads 2, 2' are assembled on the barrel 4 with the tabs 6 projecting through the apertures 8, the tabs are deformed to secure the head in place. In the illustrative embodiment shown, the tabs are deformed by being bent outwardly away from the axis of the spool and curled back upon themselves as appears in FIG. 1, so that the end of each tabs is folded into the groove 10. The tabs 6, when deformed, in effect form projections upstanding above the outer face of the head. The spool heads 2, 2' are each provided with a central opening 12 whereby the spools may be received on the driving spindle of the winding apparatus and, later, in a retail store, may be stacked for display on a rod or pin.

For the purpose of providing for driving engagement of the spool drive head with the spool during winding of the wire or other strand material thereon by the conventional procedure, an eccentric aperture 14 is formed in the head, inwardly of the circle of tabs 6, for the reception of an eccentric driving pin on the driving head. A hole 18 is provided in one head near the barrel and a similar hole 18' in the other head near its periphery for the reception respectively of the starting end and the finishing end of the length of wire wound on the spool.

Referring now to FIGS. 2, 3 and 4, the spool drive head of the invention comprises a circular metal disk 20 having a flat face 22, a central hub 24 integral therewith and a bore 26 extending through the disk and hub and concentric with both. A set screw 28 may be provided in the hub 24 for locking the drive head to the conventional spool drive spindle 30 for rotation therewith. The spindle 30, it will be understood, is driven from any suitable source of power through a clutch which is under the control of the operator for starting and stopping the spindle and drive head assembly.

The disk 20 is provided with a plurality of spaced lugs, indicated generally at 32, upstanding from the face 22 and disposed in spaced relation along a circle concentric with the bore 26 of the disk 20 and lying near the periphery of the disk. The number of lugs will preferably be the same as the number of tabs 6 on the spool with which the drive head is to be used, although a lesser number of lugs may be used. The lugs are spaced around the disk 20 at the same angular spacing as the tabs 6 are spaced around the spool head.

Each lug 32 is formed integral with the disk 20 and has an inner cylindrical surface 34, an outer conical surface 36 and two plane end surfaces 38, 38' which are normal to the flat face 22 of the disk 20. The end surfaces 38, 38' of each lug in the embodiment shown converge inwardly of the disk, but they may be disposed radially or may diverge inwardly of the disk. The disk 20 may be provided with a drive pin 16 extending outwardly from its face 22 and spaced the same distance from the axis of the disk 20 as the eccentric aperture 14 is spaced from the axis of the spool.

In FIG. 7 is shown a drive head in accordance with the invention wherein the drive pin 16 is omitted. The drive head of this modification is provided with two lugs 32 only for use with the spool of FIG. 1 having four tabs 6 equally spaced about the barrel.

In FIG. 8 is shown a modification in the nature of an adapter which may be used with a conventional drive head to provide the advantages of the invention. The spindle 30 is provided with a conventional drive head 40 secured thereto for rotation therewith. The drive head 40 carries on its outer face a drive pin 42 for engagement with the eccentric aperture 14 of the spool heads, as described. The adapter of the invention comprises a circular metal disk 44 having a central bore 46 of a size to snugly fit the spindle 30 as the disk 44 is slid into place thereon. The disk 44 carries on one face 48 a series of equally spaced lugs 50 which are identical with the lugs 32 previously described. The disk 44 further is provided with an aperture 52 disposed eccentrically of the bore 46 of the disk and spaced from the axis of the bore the same distance as the aperture 14 is spaced from the axis of the spool. When the adapter is placed on the spindle 30 it may be rotated thereon until the pin 42 is received in the aperture 52. In this position the adapter is driven by the pin 42 to rotate with the spindle 30 and drive head 40. When a spool is placed on the spindle the drive pin 42 will enter the eccentric aperture 14 in the innermost head and the lugs 50 will be received in the groove 10 between the curled tabs 6, so that the spool will be driven by the adapter.

In the operation of the spool drive head of the invention, as the spool is placed on the drive spindle 30 the spindle is received in the openings 12 of the heads 2, 2' and passes through the hollow cylindrical barrel 4. The spool is rotated on the spindle 30 to the position in which the lugs 32 lie between the projections on the outer face of the spool head which lies against the drive head and the drive pin 16, if one is present, enters the eccentric aperture 14. It will be understood that the angular position of the pin 16 with respect to the lugs 32 is such that the pin may enter the eccentric aperture 14 while permitting the lugs 32 to be received in the spaces between the tabs 6. The lugs 32, due to the shape provided by the conical outer surface 36 and the cylindrical inner surface 34, interfit with and extend into the annular depression 10 in the head so that their flat end surfaces 38, 38' make extensive engagement with the curled tabs 6. When the drive spindle 30, and with it the disk 20, is rotated, the lugs 32 rotate the spool by direct engagement with the barrel of the spool through the curled tabs 6. The driving force is transmitted from the barrel to both heads so that all parts of the spool are driven. The adapter of FIG. 8 similarly cooperates with the spool to drive it through the lugs 50 and additionally applies driving force directly to one head by pin 42.

The spool is thus engaged at a plurality of points spaced around the periphery of the barrel so that the driving force is distributed among a plurality of different parts of the spool and accordingly the driving force available at any one point to cause tearing of the metal is reduced as compared with the conventional drive in which all of the driving force is applied at one point by the drive pin. At the same time the drive pin 16, if one is present, makes driving engagement with the head 2 or 2' at the margins of the aperture 14, so that the driving force is further distributed, between the barrel and the head of the spool.

I claim:

1. A drive head for use on a drive spindle for driving a spool placed on the spindle and having a head with spaced projections on the outer face thereof and an eccentric aperture therein, which comprises a disk having a circular central aperture therein, a plurality of spaced lugs on one face of the disk projecting from said face and disposed in equally-spaced relation around a circle concentric with said central aperture, and a pin extending from said face of said disk and spaced from the axis of said central aperture, whereby said pin may project through an aperture of a head of a spool in place on the spindle and said lugs may engage said projections to drive the spool from the drive head.

2. A drive head for use on a drive spindle for driving a spool placed on the spindle and having two spaced sheet metal heads interconnected by a hollow cylindrical sheet metal barrel secured to each of the heads by a plurality of spaced tabs integral with said barrel extending through slots in the head and projecting outside of the head, which comprises a circular disk having a circular central aperture therein, a plurality of spaced lugs in one face of the disk projecting from said face and disposed in equally-spaced relation around a circle concentric with said central aperture each of said lugs having an inner cylindrical surface intersecting an outer conical surface, and two end surfaces, whereby said lugs may engage said tabs of a spool in place on said spindle to drive the spool from the drive head.

3. A drive head for use on a drive spindle for driving a spool placed on the spindle and having two spaced sheet metal heads interconnected by a hollow cylindrical sheet metal barrel secured to each of the heads by a plurality of spaced tabs integral with said barrel extending through slots in the head and projecting outside of the head, at least one of said heads having an eccentric aperture therein, which comprises a circular metal disk having a circular central aperture therein, a plurality of spaced lugs on one face of the disk projecting from said face and disposed in equally-spaced relation around a circle concentric with said central aperture each of said lugs having an inner cylindrical surface intersecting an outer conical surface, and two end surfaces disposed normal to the face of said disk and converging inwardly of the disk, and a pin extending from said face of said disk and spaced from the axis of said central aperture, whereby said pin may project through an aperture of a head of a spool in place on the spindle and said lugs may engage said tabs, to drive the spool from the drive head.

4. An adapter for use with a spool drive head and spindle assembly in which the drive head has an eccentric pin for engaging an eccentric hole in a head of a spool placed on the spindle, for adapting the head and spindle assembly for driving a spool having a head with spaced projections on the outer face thereof, which comprises a disk having a circular central aperture therein, a plurality of spaced lugs on one face of the disk projecting from said face and disposed in equally-spaced relation around a circle concentric with said central aperture, and said disk having a second aperture spaced from the axis of said central aperture, whereby said pin may project through said second aperture when the adapter is in place on said spindle to drive the adapter from the drive head.

5. An adapter for use with a spool drive head and spindle assembly in which the drive head has an eccentric pin for engaging an eccentric hole in a head of a spool placed on the spindle, for adapting the head and spindle assembly for driving a spool having two spaced heads interconnected by a hollow cylindrical sheet metal barrel secured to each of the heads by a plurality of spaced tabs integral with said barrel extending through slots in the head and projecting outside of the head, which comprises a circular disk having a circular central aperture therein, a plurality of spaced lugs on one face of the disk projecting from said face, and said disk having a second aperture spaced from the axis of said central aperture, whereby said pin may project through said second aperture when the adapter is in place on said spindle to drive the adapter from the drive head.

6. An adapter for use with a spool drive head and spindle assembly in which the drive head has an eccentric pin for engaging an eccentric hole in a head of a spool placed on the spindle, for adapting the head and spindle for driving a spool having two spaced sheet metal heads interconnected by a hollow cylindrical sheet metal barrel secured to each of the heads by a plurality of spaced tabs integral with said barrel extending through slots in the head and projecting outside of the head, which comprises a circular metal disk having a circular central aperture therein, a plurality of spaced lugs on one face of the disk projecting from said face and disposed in equally-spaced relation around a circle concentric with said central aperture, and said disk having a second aperture spaced from the axis of said central aperture, whereby said pin may project through said second aperture when the adapter is in place on said spindle to drive the adapter from the drive head.

7. An adapter for use with a spool drive head and spindle assembly in which the drive head has an eccentric pin for engaging an eccentric hole in a head of a spool placed on the spindle, for adapting the head and spindle assembly for driving a spool having two spaced sheet metal heads interconnected by a hollow cylindrical sheet metal barrel secured to each of the heads by a plurality of spaced tabs integral with said barrel extending through slots in the head and projecting outside of the head, which comprises a circular metal disk having a circular central aperture therein, a plurality of spaced lugs on one face of the disk projecting from said face and disposed in equally-spaced relation around a circle concentric with said central aperture, each of said lugs having an inner cylindrical surface intersecting an outer conical surface, and end surfaces disposed normal to said face of said disk and converging inwardly of the disk, and a second aperture in said disk spaced from the axis of said central aperture, whereby said pin may project through said second aperture when the adapter is in place on said spindle to drive the adapter from the drive head.

8. The method of driving a sheet metal spool having a head and a hollow barrel having spaced portions thereof projecting outside the head, which comprises supporting the spool for rotation about the axis of said barrel and rotating said spool by engaging and driving said spaced projecting portions.

References Cited in the file of this patent

UNITED STATES PATENTS

| | | |
|---|---|---|
| Re. 16,762 | De Vry | Oct. 4, 1927 |
| 400,864 | Lund | Apr. 2, 1889 |
| 1,021,626 | Peirce | Mar. 26, 1912 |
| 1,958,126 | Bowen | May 8, 1934 |
| 2,219,868 | Hambleton | Oct. 29, 1940 |
| 2,261,841 | Booth | Nov. 4, 1941 |